United States Patent [19]

Reynolds

[11] Patent Number: 4,748,395
[45] Date of Patent: May 31, 1988

[54] DUAL VOLTAGE ELECTRICAL SYSTEM

[75] Inventor: Michael G. Reynolds, Utica, Mich.

[73] Assignee: General Motors Corporation, Detroit, Mich.

[21] Appl. No.: 82,492

[22] Filed: Aug. 7, 1987

[51] Int. Cl.$^4$ .................. H02J 7/14; H02M 5/30; H02P 9/00

[52] U.S. Cl. .................. 320/17; 322/29; 322/90; 322/94; 363/162

[58] Field of Search .............. 322/28, 90, 94; 307/16; 320/6, 15, 16, 17, 64, DIG. 2; 363/162

[56] References Cited

U.S. PATENT DOCUMENTS

| | | | |
|---|---|---|---|
| 3,293,448 | 12/1966 | Amato | 307/261 |
| 3,320,514 | 5/1967 | Lawrence | 363/162 |
| 3,832,624 | 8/1974 | Gilmore et al. | 363/162 X |
| 3,882,371 | 5/1975 | Shimer et al. | 363/162 |
| 3,942,092 | 3/1976 | Bourbeau et al. | 363/162 |
| 4,686,422 | 8/1987 | Radomski | 320/17 |

Primary Examiner—R. J. Hickey
Attorney, Agent, or Firm—C. R. Meland

[57] ABSTRACT

A dual voltage motor vehicle electrical system wherein a pair of batteries are connected in series across the direct voltage output terminals of a bridge rectifier that is connected to a polyphase output winding of an alternating current generator. First and second groups of controlled rectifiers are connected between a junction of the batteries and the generator output winding. In low speed operation of the generator the groups of controlled rectifiers are alternately biased conductive. The time period of conduction of the groups of controlled rectifiers is controlled as a function of the difference in the voltages across the respective batteries. The phase voltages of the output winding are summed by a summing amplifier to provide a control signal. The system includes means responsive to the control signal for preventing simultaneous conduction of the groups of controlled rectifiers.

5 Claims, 2 Drawing Sheets

DUAL VOLTAGE ELECTRICAL SYSTEM

This invention relates to a dual voltage electrical system and more particularly to a dual voltage electrical system for a motor vehicle.

This invention is an improvement of the dual voltage electrical system disclosed in U.S. patent application Ser. No. 856,769, Thomas A. Radomski, filed on Apr. 28, 1986 now U.S. Pat. No. 4,686,442 and assigned to the assignee of this invention. In that patent application a dual voltage electrical system is disclosed wherein an alternating current is connected to a polyphase bridge rectifier and a pair of batteries are series connected across the direct voltage output terminals of the bridge rectifier. The system has two groups of controlled rectifiers that are connected to the generator and to the batteries. In one mode of operation the groups of controlled rectifiers are alternately and sequentially gated conductive for predetermined time periods to thereby charge the battery with the lower voltage for the largest time period.

With the system that has been described, care must be taken not to allow the two groups of controlled rectifiers to be simultaneously gated conductive because this would short-circuit the output winding of the alternating current generators. In the above-referenced patent application a dead zone network is provided that is operative to provide a fixed time delay between the removal of the gating signal from one group of controlled rectifiers and the subsequent application of the gating signal to the other group of controlled rectifiers. This time delay is set at a fixed length of time sufficiently long to allow the one group of controlled rectifiers to completely turn-off (commutate) after its gating signal is removed under worst case conditions before a gating signal is applied to the other group of controlled rectifiers to avoid short-circuiting the output windings of the alternator For all cases other than worst case conditions, there will be a finite length interval between when one group of controlled rectifiers turns off and the other group turns on. During this interval, the alternator produces no output current. The disadvantage of the use of the fixed time delay or dead zone is that the average maximum output current of the alternator is less than it could be if there was no time interval between the turnoff of one group of controlled rectifiers and the turn on of the other group of controlled rectifiers.

It accordingly is an object of this invention to provide a dual voltage electrical system of the type described wherein the interval or dead zone between the turn-off of one group of controlled rectifiers and the subsequent turn-on of the other group of controlled rectifiers is reduced to near zero.

IN THE DRAWINGS

Figure 1:
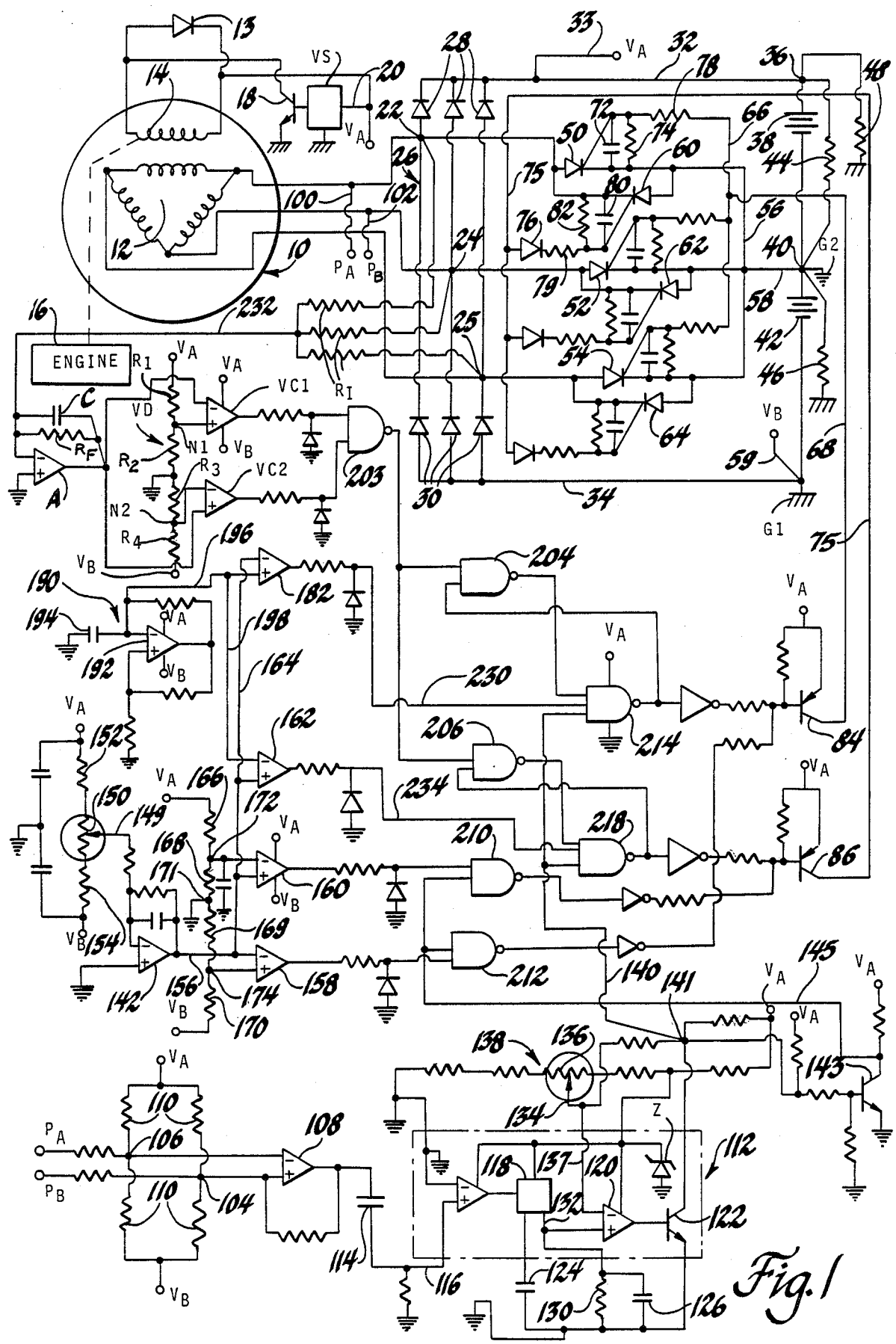
FIG. 1 is a schematic circuit diagram of a dual voltage motor vehicle electrical system made in accordance with this invention.

Referring now to FIG. 1 of the drawings, the reference numeral 10 designates an alternating current generator that has a three-phase Delta connected stator or output winding 12 and a field winding 14. The output winding 12 can be Y-connected The field winding 14 is carried by the rotor of the generator in a well known manner and the rotor is driven by an engine 16 of a motor vehicle through, for example, a belt and pulley arrangement which has not been illustrated.

The field winding 14 is connected to a voltage regulator that comprises an NPN transistor 18 connected in series with field winding 14 and a voltage sensing circuit VS coupled to the base of transistor 18. A field discharge diode 13 is connected across field winding 14. The voltage sensing circuit senses the voltage on conductor 20 which is connected to a node or junction $V_A$. Various other nodes or junctions are shown in FIG. 1 that are also identified as $V_A$ and all of these junctions, or nodes of like $V_A$ designation, are electrically connected by conductors that are not illustrated.

The phase windings of generator output winding 12 are connected to the AC input terminals 22, 24 and 25 of a three-phase full-wave bridge rectifier 26 comprised of three positive diodes 28 and three negative diodes 30. The cathodes of diodes 28 are connected to a power supply conductor 32 and the anodes of diodes 30 are connected to a power supply conductor 34 that is connected to motor vehicle ground G1. Ground G1 and all other nodes in the circuit with a like ground symbol are connected together by this ground. In FIG. 1 another ground symbol G2 has been used and all nodes or points with this ground symbol are connected together. The conductor 32 is connected to a junction $V_A$ by conductor 33 and accordingly all junctions designated $V_A$ in FIG. 1 have the same voltage as the voltage on conductor 32.

The conductor 32 is connected to a junction 36. A 12 volt motor vehicle storage battery 38 is connected between junctions 36 and 40 and another 12 volt motor vehicle storage battery 42 is connected between junction 40 and ground G1. Junction 40 is connected directly to ground G2. The circuit elements 44, 46 and 48, which are shown as resistors, represent motor vehicle electrical loads which are connected with suitable control switches that have not been illustrated. Loads 44 and 46 are so-called 12 volt loads since they are energized with 12 volts. Load 48 is a so-called 24 volt load since it is energized with 24 volts.

Returning now to the operation of the generator voltage regulator, the voltage sensing circuit VS senses the voltage appearing between conductor 32 and ground and controls the conduction of transistor 18 in accordance with the voltage that is sensed. In the foregoing description of this invention it has been assumed that batteries 38 and 42 are 12 volt batteries. Based on this, the voltage regulator can be arranged such that it controls field current so that the regulator maintains the voltage between conductor 32 and ground G1 at a desired regulated value of about 29 volts. Thus, if the voltage appearing between conductor 32 and ground G1 exceeds 29 volts the voltage regulator biases the transistor 18 non-conductive to cutoff field current. When the voltage between conductor 32 and ground G1 now drops below the desired regulated value of 29 volts the transistor 18 is biased conductive to energize the field winding 14. The field winding 14 is energized with 29 volts since it is connected between junction $V_A$ and ground G1 through the collector-emitter circuit of transistor 18.

The dual voltage electrical system has a first bank or group of three silicon controlled rectifiers 50, 52 and 54. The cathodes of these controlled rectifiers are all connected to a conductor 56 which in turn is connected to junction 40 via conductor 58. The anodes of controlled rectifiers 50–54 are connected respectively to the AC input terminals of the bridge rectifier 26 and hence to the phase windings of the output winding 12.

The dual voltage electrical system further has a second bank or group of three silicon controlled rectifiers 60, 62 and 64. The anodes of these controlled rectifiers are connected to conductor 56 while the cathodes of this group of controlled rectifiers are connected respectively to the AC input terminals of the bridge rectifier 26.

The gate bias circuit for controlled rectifiers 50–54 comprises a conductor 66 that is connected with a conductor 68. The gate electrode of controlled rectifier 50 is connected to conductor 66 via resistor 78. The gate of controlled rectifier 50 is also connected to a capacitor 72 and a resistor 74. The other two controlled rectifiers 52 and 54 are connected in the same fashion to conductor 68.

The gate electrodes of controlled rectifiers 60, 62 and 64 are connected to a conductor 75. Thus, the gate of controlled rectifier 60 is connected to conductor 75 by a diode 76 and resistor 79. The gate of controlled rectifier 60 is also connected to capacitor 80 and resistor 82. The controlled rectifiers 62 and 64 are connected to conductor 75 by circuits that are identical with the one that has been described in connection with the gate electrode of controlled rectifier 60.

The conductor 68 is connected with the collector of a PNP transistor 84. The emitter of this transistor is connected to junction $V_A$ and hence to plus 24 volts. The conductor 75 is connected to the collector of PNP transistor 86. The emitter of this transistor is connected to junction $V_A$ and hence to plus 24 volts.

Whenever transistor 84 is biased conductive, a direct voltage is applied to the gates of controlled rectifiers 50, 52 and 54 to gate these controlled rectifiers conductive. When controlled rectifiers 50–54 are gated conductive the battery 42 is charged from a circuit that includes controlled rectifiers 50–54 and diodes 30. This circuit can be traced from the AC input terminals of bridge rectifier 26, through conducting controlled rectifiers 50–54, to conductor 56, through conductor 58 to junction 40, through battery 42 to conductor 34 and then through diodes 30 to the AC input terminals of bridge rectifier 26.

When transistor 84 is biased nonconductive there is no gate voltage applied to controlled rectifiers 50–54 and accordingly these controlled rectifiers are commutated to a nonconductive state.

Whenever transistor 86 is biased conductive a direct gate bias voltage is applied to the gates of controlled rectifiers 60–64 via line 75 and a respective diode such as diode 76. When controlled rectifiers 60–64 are biased conductive, the battery 38 is charged from the generator via a circuit that includes conducting controlled rectifiers 60–64 and diodes 28. This circuit can be traced from the AC input terminals of bridge rectifier 26, through diodes 28, through conductor 32 to junction 36, through battery 38 to junction 40 and then through conducting controlled rectifiers 60–64 to the AC input terminals of bridge rectifier 26. When transistor 86 is biased nonconductive no gate voltage is applied to controlled rectifiers 60–64 and accordingly these controlled rectifiers are commutated to a nonconductive state.

In the foregoing description of the conductive states of the groups of controlled rectifiers it has been pointed out that battery charging current is supplied to a given battery when a given group of controlled rectifiers is biased conductive. Current is also supplied to the respective loads 44 and 46 which are connected across batteries 38 and 42 and also to load 48 which is connected across the series connection of batteries 38 and 42.

The conductor 34 is at a negative 12 volts relative to ground G2 and is connected to a node or junction $V_B$ by conductor 59. This node or junction $V_B$ is connected to other nodes or junctions shown in FIG. 1 which are designated as $V_B$.

Two of the phase leads that are connected to the output winding 12 and the bridge rectifier 26 are connected respectively to conductors 100 and 102. The conductor 100 is connected to a junction $P_A$ while conductor 102 is connected to junction $P_B$. There are other junctions shown in FIG. 1 which are identified as $P_A$ and $P_B$ and all of these junctions are electrically connected by conductors which have not been illustrated.

The dual voltage system of this invention can operate in either a so-called 12 volt mode or a so-called 24 volt mode, depending upon the speed of the generator. The system operates in the so-called 12 volt mode when generator speed is, for example, below 2800 rpm. This may correspond to an engine speed of about 900 rpm due to the speed ratio provided by the belt and pulley arrangement that connects the engine 16 and the rotor of the generator. At generator speeds above 2800 rpm the system operates in the 24 volt mode.

When the system is operating in the 12 volt mode the groups of controlled rectifiers are alternately and sequentially gated conductive. Thus, the sequence is such that, for example, controlled rectifiers 50–54 are gated conductive, then allowed to commutate, then controlled rectifiers 60–64 are gated conductive, then allowed to commutate, and then controlled rectifiers 50–54 are once again gated conductive and so on. The time period that a given group of controlled rectifiers is gated conductive is dependent upon the relative magnitudes of the voltages across batteries 38 and 42 and the manner in which this is achieved will be described hereinafter.

When the system is operating in the 24 volt mode the system will charge batteries 38 and 42 in series using bridge rectifier diodes 28 and 30 and will also select one or the other of the two groups of controlled rectifiers to provide additional charge to whichever battery is subjected to a heavier load. The system operates by comparing the relative magnitudes of the voltages across batteries 38 and 42 and then operates to cause a group of controlled rectifiers to be conductive that will cause charging of the battery that has the lower voltage. By way of example, if the voltage across battery 42 is lower than the voltage across battery 38 the system will operate to cause controlled rectifiers 50–54 to be biased conductive. The manner in which this is accomplished will be more fully described hereinafter.

In order to provide a speed signal for selecting the mode of operation, the system responds to the voltages at junctions $P_A$ and $P_B$. The alternating voltages at these junctions has a frequency which is a function of generator speed. The junctions $P_A$ and $P_B$ are connected to junctions 104 and 106 through resistors and these junctions are in turn connected to the input terminals of an operational amplifier 108. The junctions 106 and 104 are connected to voltage divider resistors 110 which typically have equal resistance values. The output of the amplifier 108 is applied to a frequency to voltage converter 112 via capacitor 114 and conductor 116. The voltage on conductor 116 is an alternating voltage which has a frequency corresponding to generator speed. The frequency to voltage converter 112 may be a type LM 2917 device. The frequency to voltage converter includes a charge pump circuit 118, a voltage comparator 120 and an NPN transistor 122. The frequency to voltage converter further includes capacitors 124 and 126 and a resistor 130. The frequency to voltage converter causes a direct voltage to be developed in a known manner on conductor 132 which is a function of the frequency of the output voltage of the output winding 12 and hence a direct voltage that is a function of generator speed. This direct voltage is applied to the positive terminal of the voltage comparator 120. The negative terminal of the voltage comparator is connected to a wiper 134 of a variable resistor 136 via conductor 137. The variable resistor 136 forms part of a voltage divider 138 that is connected between junction 135, a reference Zener diode Z, and ground. The voltage comparator 120 compares the speed related direct voltage on conductor 132 with a reference voltage at the wiper 134 of resistor 136. When the speed related voltage on conductor 132 exceeds the reference voltage on wiper 134 the output of the comparator 120 goes high to thereby bias transistor 122 conductive. When the speed related voltage on conductor 132 is less than the reference voltage at wiper 134 the output of the voltage comparator 120 goes low thereby causing the transistor 122 to be biased nonconductive.

The emitter of transistor 122 is connected to ground G2 and its collector is connected to a conductor 140 at junction 141. Therefore, when transistor 122 is biased conductive the voltage on conductor 140 goes to a low logic state and when transistor 122 is nonconductive the voltage on conductor 140 goes to a high level logic state. Thus, when generator speed is below 2800 rpm the transistor 122 is biased nonconductive thereby causing a high logic level voltage to be developed on conductor 140. When engine speed is above the predetermined value of 2800 rpm the transistor 122 is biased conductive thereby causing the voltage on conductor 140 to go to a low logic level near ground potential. The logic level of the voltage on conductor 140 will determine whether the system will operate in the 12 volt mode or in the 24 volt mode.

The junction 141 is connected to the base of an NPN transistor 143 through an unnumbered resistor. The collector of transistor 143 is connected to a conductor 145. When transistor 122 is conductive, transistor 143 is biased nonconductive and when transistor 122 is nonconductive, transistor 143 is biased conductive.

The system has an operational error amplifier 142 which develops an output voltage that is a function of the relative magnitudes of the voltages across batteries 38 and 42. The positive terminal of the error amplifier 142 is connected to ground and hence to junction 40.

The negative terminal of the error amplifier 142 is connected to a wiper or slider 149 of a variable resistor 150. The variable resistor is connected in series with voltage divider resistors 152 and 154. The resistors 152, 150 and 154 are connected between junctions $V_A$ and $V_B$ and accordingly the voltage between conductors 32 and 34 is applied across resistors 152, 150 and 154. Thus, in a 12/24 volt system 24 volts is applied across these resistors. The system is arranged such that when the voltages across batteries 38 and 42 are substantially equal the voltage applied to the negative terminal of the error amplifier 142 will be approximately equal to the voltage at junction 40. Fundamentally, the voltage divider comprised of resistors 152, 150 and 154 develops a voltage that is related to the voltage appearing between conductors 32 and 34. The error amplifier 142 develops an output voltage on conductor 156 which is a function of the difference in the voltages applied to its input terminals.

The output voltage of the error amplifier 142 on conductor 156 is applied to the negative input terminal of voltage comparator 158 and to the positive input terminal of voltage comparator 160. This output voltage is also applied to the positive input terminal of voltage comparator 162 and the negative input terminal of voltage comparator 182 by conductor 164. A voltage divider comprised of series connected resistors 166, 168, 169 and 170 is connected between junctions $V_A$ and $V_B$ so that the voltage between these junctions is applied across these resistors. Midpoint junction 171 of this voltage divider is connected to ground G2. This voltage divider also has junctions 172 and 174 which are respectively connected to the negative input terminal of voltage comparator 160 and the positive input terminal of voltage comparator 158.

The system of this invention has a triangular voltage waveform generator which is generally designated by reference numeral 190. This triangular voltage waveform generator includes a voltage comparator 192 and a capacitor 194. This waveform generator is energized and develops an output voltage on conductor 196 which is applied to the positive input terminal of the voltage comparator 182 and to the negative input terminal of the voltage comparator 162 via line 198. The triangular voltage that is developed by the circuit that has just been described and which is applied to conductor 196 is illustrated in FIG. 2A where it is identified by reference numeral 200. The frequency of the triangular voltage may be about 25 Hz.

The logic level of the voltage on conductor 140 determines whether the system will operate in the 12 volt mode or the 24 volt mode. The voltage on conductor 140 is applied to inputs of NAND gates 214 and 218. The conductor 145 is connected to inputs of NAND gates 210 and 212. The output of comparator 160 is connected to an input of NAND gate 210 and the output of comparator 158 is connected to an input of NAND gate 212. The output of NAND gate 210 is connected to the base of transistor 86 through an inverter. The output of NAND gate 212 is connected to the base of transistor 84 through an inverter.

The base of transistor 84 is connected to the output of NAND gate 214 by an inverter. In a similar fashion the output of NAND gate 218 is connected to the base of transistor 86 through an inverter. The output of voltage comparator 182 is connected to an input to gate 214 via conductor 230. The output of voltage comparator 162 is connected to an input to gate 218 via conductor 234.

The phase winding junctions 22, 24 and 25 are connected to a conductor 232, respectively, through resistors $R_I$. The conductor 232 is connected to the negative input terminal of a summing amplifier A which operates to sum the voltages across the controlled rectifiers 50-54 and 60-64. The positive terminal of amplifier A is connected to ground G2 and hence to junction 40. In this configuration, summing amplifier A is inverting. Summing amplifier A also filters the sum of the voltage by virtue of the connection of compacitor C from the output to the negative input terminal, in parallel with feedback resistor $R_F$. The gain of the summing amplifier is essentially the ratio of $-R_F/R_I$.

The output of amplifier A is connected to the negative input terminals of voltage comparators VC1 and VC2. The positive input terminals of comparators VC1 and VC2 are connected to junctions or nodes of a voltage divider VD that is comprised of four series-connected resistors $R_1$, $R_2$, $R_3$ and $R_4$ that are connected across junctions $V_A$ and $V_B$. A midpoint junction 233 of this voltage divider is connected to ground G2. Resistors $R_1$ and $R_4$ may be 10 K ohms and resistors $R_2$ and $R_3$ may be 30 K ohms.

The outputs of voltage comparators VC1 and VC2 are connected respectively to inputs of a NAND gate 203. The output of NAND gate 203 is connected to inputs of NAND gates 204 and 206. The output of NAND gate 214 is connected to another input of gate 204. The output of gate 206 is connected to an input of NAND gate 218. The output of gate 218 is connected to an input of gate 206.

During operation of the system, voltage comparators 182, 162, 160 and 158 develop output voltages (high or low logic levels) in accordance with the relative magnitudes of the input voltages applied to the inputs of these comparators. The NAND gate logic that is connected to conductors 140 and 145 operates such that when the system is operating in the 12 volt mode (low engine and generator speed) the outputs of comparators 182 and 162 control the switching of transistors 84 and 86 and the outputs of comparators 160 and 158 have no effect on the switching of transistors 84 and 86. Putting it another way, the outputs of comparators 182 and 162 control the switching of transistors 84 and 86 and the outputs of comparators 160 and 158 are ignored. On the other hand, when the system is operating in the 24 volt mode (generator speed above a predetermined speed) the output voltages of comparators 160 and 158 control the switching of transistors 84 and 86 and the output voltages of comparators 182 and 162 have no effect on the switching of transistors 84 and 86. As previously mentioned, the system is set to operate in the 12 volt mode at generator speeds below 2800 rpm and in the 24 logic that has been described responds to the high or low logic level voltages on conductors 140 and 145 to set the system into either the 12 volt mode or the 24 volt mode.

The operation of the system will now be described with the assumption that the system is set to operate in the 12 volt mode. It will be further assumed that the voltage across battery 42 is lower than the voltage across battery 38. Under this condition of operation the positive terminal of comparator 182 compares the triangular voltage 200 (FIG. 2A) with a direct voltage level identified as 240 in FIG. 2A. The direct voltage level 240 represents the output voltage of error amplifier 142 which is applied to conductors 156 and 164. The direct voltage level 240 is a function of the difference in voltages of slider 149 and the voltage of junction 40 which is connected to ground G2. The voltage at junction 40 is a function of the relative magnitudes of the voltages across batteries 38 and 42 and the voltage of slider 149 is a divided down representation of the voltage between conductors 32 and 34. The comparator 162 compares the triangular voltage 200 with the error voltage level 240.

FIGS. 2B and 2C depict respectively the voltages on conductors 230 and 234 under the assumed conditions that the system is operating in the 12 volt mode and that the voltage across battery 42 is lower than the voltage across battery 38.

Referring now to FIG. 2A, when the triangular voltage 200 exceeds voltage level 240 at point 244 the output voltage of comparator 182 goes high to develop the voltage 246 shown in FIG. 2B. When the triangular voltage 200 goes below voltage level 240 at point 248 the output voltage 246 of comparator 182 goes low. During the time that the square wave voltage 246 is high, it is desired to gate the controlled rectifiers 50–54 conductive and accordingly charge battery 42. During the time that the square wave voltage 246 is low it is desired to remove the gate signal from the controlled rectifiers 50–54 and allow them to commutate (turn off).

Referring back to FIG. 2A, when the triangular voltage 200 is below voltage level 240 at point 248 the output voltage of comparator 162 goes high to develop the voltage 252 shown in FIG. 2C. When the triangular voltage 200 exceeds voltage level 240 at points 244 and 254, the output voltage of comparator 162 goes low. During the time that the square wave voltage 252 is high, it is desired to gate the controlled rectifiers 60–64 conductive and accordingly charge battery 38. During the time that the square wave voltage 252 is low, it is desired to remove the gate signal from the controlled rectifiers 60–64 and allow them to commutate.

FIG. 2D depicts the current in conductor 58, identified by reference number 247. Also shown is the reference level of zero current identified by reference numeral 249. Current 247 has a positive portion, identified by reference numeral 256, corresponding to when controlled rectifiers 50–54 are conducting. Current 247 also has a negative portion, identified by reference numeral 258, corresponding to when controlled rectifiers 60–64 are conducting.

Reference point 251 corresponds to the time when the gating signal is removed from controlled rectifiers 50–54. Reference point 253 corresponds to the time when the current in controlled rectifiers 50–54 reaches zero. Reference point 253 also corresponds to the time when the gating signal is applied to controlled rectifiers 60–64 and they begin to conduct.

Reference point 251 occurs at essentially the same time as the transition from high to low of comparator 182, shown in FIG. 2B as reference numeral 246A. Similarly reference point 255 corresponds to the time when the gating signal is removed from controlled rectifiers 60–64.

Reference point 255 occurs at essentially the same time as the transition from high to low of comparator 162, shown in FIG. 2C as reference numeral 252B.

Referring again to FIG. 2D, reference point 257 corresponds to the time when the current in controlled rectifiers 60–64 reaches zero. Reference point 257 also corresponds to the time when the gating signal is applied to controlled rectifiers 50–54 and they begin to conduct.

From the foregoing description it will be evident that the system provides constant frequency variable pulse width control of battery charging current. Moreover, the relative time periods or pulse widths that battery charging current is supplied to the batteries is a function of the difference in the voltages across the batteries.

Figure 2:
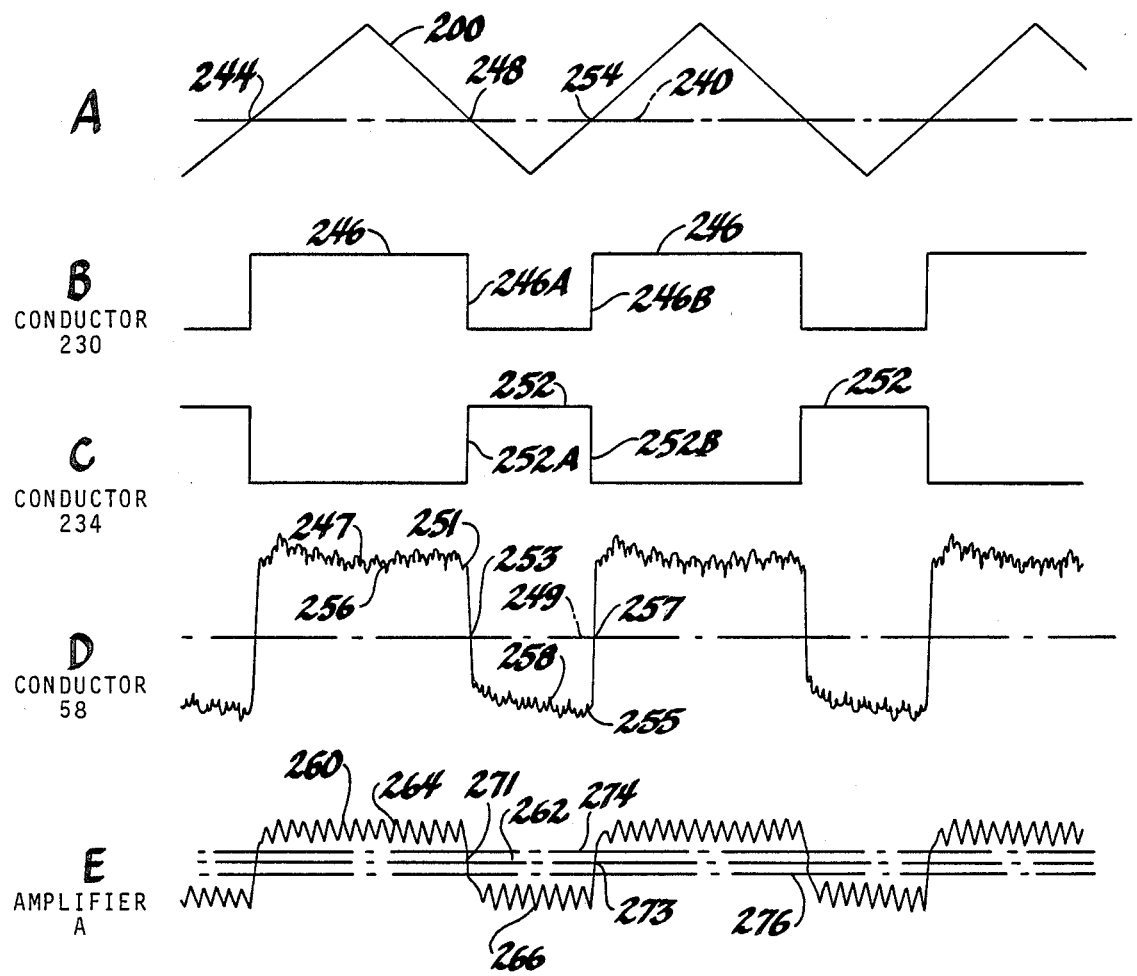
FIGS. 2A–2E illustrates various waveforms of voltages and currents that relate to the system illustrated in FIG. 1.

The waveforms of FIG. 2 depict the condition of operation in which the voltage across battery 42 is lower than the voltage across battery 38 and under this condition of operation battery 42 is supplied with charging current for longer periods of time than periods of time that battery 38 is charged. The voltage level 240 shifts in response to the difference in the voltages across batteries 38 and 42. In a condition of operation in which the voltage across battery 38 is lower than the voltage across battery 42 the voltage level 240 shifts upward in FIG. 2A to a point where battery 38 would be supplied with current for a longer time period than battery 42. In other words, the pulse width of voltage 246 would shorten and the voltage pulse 252 would get longer.

If the voltages across batteries 38 and 42 are substantially equal (balanced load condition) the system operates such that the time duration of voltages 246 and 252 are substantially equal with the result that the time periods that the batteries 38 and 42 are supplied with charging current will be substantially equal, that is the two groups of controlled rectifiers will be alternately and consecutively gated conductive for substantially equal time periods.

The system of this invention prevents the two groups of controlled rectifiers 50-54 and 60-64 from being biased simultaneously conductive while eliminating the interval when neither group of controlled rectifiers is biased conductive. If the two groups of controlled rectifiers were simultaneously conducting, the phase windings of the alternator would be short-circuited and the alternator would not deliver any power. If the two groups of controlled rectifiers were simultaneously non-conducting, the phase windings of the alternator would be open-circuited and the alternator would not deliver any power. The system of invention accomplishes the avoidance of both open-circuiting and short-circuiting the alternator in the following manner. After the removal of a gating signal from one group of controlled rectifiers, the application of a gating signal to the other group of controlled rectifiers is inhibited until the current has essentially reduced to zero in the one group of controlled rectifiers. Once the current has been essentially reduced to zero in the one group of rectifiers, the inhibition is removed and a gating signal is applied to the other group of controlled rectifiers. It is necessary for the operation of this invention to be able to sense when the current in either group of controlled rectifiers is essentially zero. This can be accomplished by sensing the current in conductor 58 with some sort of an external current sensing device, such as a current shunt, a current transformer or current probe.

The system of this invention senses when the current in conductor 58 is essentially zero without the use of an external current sensing device, but instead utilizes voltage sensing of the alternator output terminals 22, 24 and 25.

Each of these three terminal voltages is applied to the negative input terminal of summing amplifier A, and the positive input terminal is connected to ground G2, making summing amplifier A also an inverting amplifier. There is a capacitor C connected from the output of A to negative input terminal of A to provide some filtering to the output of A. For the 12 volt mode of operation, the output voltage of summing amplifier A is shown in FIG. 2E, where it is designated by reference numeral 260. In FIG. 2E, the line 262 represents zero voltage and ground G2 voltage level. Waveform 260 has a positive portion designated by reference numeral 264 corresponding to the interval when controlled rectifiers 50-54 are conducting and battery 42 is being charged. Waveform 260 also has a negative portion designated by reference numeral 266 corresponding to the interval when controlled rectifiers 60-64 are conducting and battery 38 is being charged. Reference numerals 271 and 273 indicates the points in time when the output of summing amplifier is essentially zero with respect to ground level G2.

It is essential that the zero crossings of waveform 260 shown in FIG. 2E denoted by reference numerals 271 and 273 occur at essentially the same time as the zero crossings of waveform 247 shown in FIG. 2D denoted by reference numerals 253 and 257, in order for waveform 260 to be used as representative of waveform 247. Inspection of FIGS. 2D and 2E prove that this is indeed the case. An explanation of why this is true is now offered.

Assume battery 42 is being charged. For typical automotive alternator construction, the winding inductances are of values so that one of the following three conditions is true. Either one diode in block 30 and one controlled rectifier in block 50-54 are conducting; two diodes in block 30 and one controlled rectifier in block 50-54 are conducting; or one diode in block 30 and two controlled rectifiers in block 50-54 are conducting. Furthermore, the anode of a conducting controlled rectifier is never connected to the same winding terminal of the alternator as the cathode of a conducting diode. Therefore by Kirchoff's voltage law, a winding terminal will be at a potential equal to the voltage drop ($V_R$) across a conducting controlled rectifier with respect to ground G2 when the controlled rectifier connected to that terminal is conducting. Furthermore, a winding terminal will be at a potential equal to the voltage drop ($V_D$) across a conducting diode below $V_B$, that is, ($V_B - V_D$) when a diode connected to that terminal is conducting.

When neither a diode or a controlled rectifier attached to an alternator winding terminal is conducting, then the potential of that terminal must be between $V_R$ and $V_B - V_D$. In an automobile environment $V_R$ and $V_D$ are typically one volt, and $V_B$ has been assumed to be nominally—twelve volts. Therefore, when charging battery 42, the terminal voltage on any of the three alternator windings must be less than or equal to one volt and greater than or equal to negative thirteen volts. Summing amplifier A has a gain—$R_F/R_I$. $R_F$ and $R_I$ are chosen so that amplifier A does not saturate, typically $R_I = 3 \cdot R_F$, so the gain is $-\frac{1}{3}$.

When one diode and two controlled rectifiers conduct, the output of amplifier A is $3\frac{2}{3}$ volts. When one controlled rectifier and two diodes conduct, the output of amplifier A is $8\frac{1}{3}$ volts. When one controlled rectifier and one diode conduct, the output of amplifier A is between $3\frac{2}{3}$ and $8\frac{1}{3}$. This describes waveform 260, in the positive portion labeled 64. Thus when battery 42 is being charged, the output of summing amplifier A is significantly greater than zero.

Now assume the gating signal has been removed from controlled rectifier block 50-54 at transition 64A corresponding to point 251. After the removal of the gating signal, one controlled rectifier and one diode still conduct until the controlled rectifier commutates at point 253. Now no controlled rectifier and no diodes are conducting, and the alternator is open-circuited. On a balanced three phase alternator with essentially sinusoidal open-circuit voltage characteristic, the sum of the three terminal voltages is zero, which can be proven trigonometrically. Thus the output of summing amplifier A is essentially zero. Therefore, when the current is conductor 58 is zero, the amplifier output is zero.

Now assume controlled rectifiers 60-64 are supplied a gating signal and battery 38 is being charged. When a diode in block 28 is conducting the potential of an alternator terminal attached to the anode of that diode is $V_D+V_A$. When a controlled rectifier in block 60-64 is conducting the potential of an alternator terminal attached to the cathode of that controlled rectifier is $-V_R$. When neither a diode or a controlled rectifier connected to an alternator terminal is conducting, the potential of the terminal is between $V_D+V_A$ and $-V_R$. Using the numbers of twelve volts for $V_A$ and one volt for $V_R$ and $V_D$. An alternator terminal potential must be less than or equal to thirteen volts and greater than or equal to negative one volt.

Again assuming summing amplifier A has a gain of $-\frac{1}{3}$, the output of A is $-8\frac{1}{3}$ volts when two diodes and one controlled rectifier conduct, $-3\frac{2}{3}$ volts when one diode and two controlled rectifier are conducting, and less then $-3\frac{2}{3}$ volts but greater than $-8\frac{1}{3}$ volts when one diode and one controlled rectifier are conducting. Thus when battery 38 is being charged, the output of summing amplifier is clearly negative as seen in FIG. 2E reference numeral 266.

The comparator VC1 and VC2 compare the output voltage (summed terminal voltages) of summing amplifier A with voltages that have a predetermined relationship to the ground G2 voltage level. The voltage at node N1 is formed by the connection of $R_1$ to $V_A$ and N1 and by the connection of $R_2$ to N1 and to ground G2. The voltage level at node N1 is represented in FIG. 2E by reference numeral 274. When the voltage level 260 is greater than voltage level 274, comparator VC1 is low. When the voltage level 260 is less than voltage level 274, comparator VC1 is high. Similarly, the voltage at node N2 is formed by the connection of $R_4$ to $V_B$ and to N1 and by the connection of $R_3$ to N1 and to ground G2. The voltage level at node N2 is represented in FIG. 2E by reference numeral 276. When the voltage level 260 is less than voltage level 276, comparator VC2 is low. When the voltage level 260 is greater than voltage level 276, comparator VC2 is high.

The outputs of comparators VC1 and VC2 are connected to the inputs of NAND gate 203 via unlabeled resistors. The output for gate 203 is high for all conditions except when both comparator VC1 and VC2 are high. In this case the output of gate 203 is low. This condition occurs when the output voltage at summing amplifier A is both less than the voltage at node N1 and greater than the voltage at node N2. Therefore, the components R1 through R4, VC1, VC2, the unlabeled resistors and gate 203 form a zero detection circuit that is low when the voltage output of summing amplifier A is sufficiently close to the level of ground G2, and is high when the output of summing amplifier A is not sufficiently close to G2.

The NAND gates 204 and 214 and NAND gates 206 and 218 form latching circuits. NAND gates 204 and 214 ensure a gating signal will not be applied to controlled rectifiers 50-54 until both NAND gate 203 is low and comparator 182 is high. NAND gates 204 and 214 also ensure that the gating signal will not be removed from controlled rectifiers 50-54 until comparator 182 is low, regardless of the state of NAND gate 203. The latching circuit formed by NAND gates 206 and 218 perform the identical functions with respect to controlled rectifiers 60-64, NAND gate 203 and comparator 162.

Referring to FIG. 2B, let it be assumed that voltage 246 has made the negative transition 246A. When this transition occurs controlled rectifiers 50-54 will, via the NAND gate circuitry, be biased nonconductive. When voltage transition 252A occurs controlled rectifiers 60-64 are to be biased conductive. However, before controlled rectifiers 60-64 are allowed to be biased conductive the summed voltage signal 260 (FIG. 2E) must equal the zero voltage level 262. When the summed voltage 260 does equal zero the output of gate 203 goes high which then permits the NAND gate logic and transistor 86 to bias controlled rectifiers 60-64 conductive. With this control arrangement there is only a very slight delay between the shut-off of controlled rectifiers 50-54 and the turn-on of controlled rectifiers 60-64. Moreover, as is evident from an inspection of FIGS. 2D and 2E, the zero crossings of the battery current and summed voltages substantially coincide.

The system operates in the same fashion when a transition 252B is followed by a transition 246B. Thus, with controlled rectifiers 60-64 biased off, controlled rectifiers 50-54 are not allowed to conduct until summed voltage 260 equals the zero voltage level 262.

If it is now assumed that generator speed is above the switch point speed of about 2800 rpm, the system will be set to operate in the 24 volt mode. In the 24 volt mode the outputs of comparators 182 and 162 no longer control the system and the outputs of comparators 160 and 158 assume control of the system. The comparator 160 compares the voltage at junction 172 with the output voltage of error amplifier 142 and the comparator 158 compares the voltage at junction 174 with the output voltage of error amplifier 142.

If it is assumed now that the voltage across battery 42 is sufficiently higher than the voltage across battery 38 to produce an output voltage from amplifier 142 that is higher in voltage than the voltage of junction 172 the output voltage of comparator 160 will go high which will in turn cause transistor 86 to be biased conductive. The conduction of transistor 86 will cause controlled rectifiers 60-64 to be biased conductive and accordingly charging current will be supplied to battery 38 via conducting controlled rectifiers 60-64. At this time the output voltage of error amplifier 142 is higher than the voltage at junction 174 and accordingly the output voltage of comparator 158 is low. This causes the transistor 84 to be biased nonconductive with the result that controlled rectifiers 50-54 are not biased conductive. As long as the voltage across battery 42 is higher than the voltage across battery 38 controlled rectifiers 60-64 are biased conductive and controlled rectifiers 50-54 are nonconductive.

If conditions change such that the voltage across battery 38 is now higher than the voltage across battery 42 the output voltage of error amplifier 142 will go lower than the voltage at junction 174 and lower than the voltage at junction 172. Accordingly, the output of comparator 160 will go low and the output of comparator 158 will go high. This will cause transistor 84 to be biased conductive and transistor 86 nonconductive with the result that controlled rectifiers 50-54 are biased conductive and controlled rectifiers 60-64 are nonconductive. Battery 42 is now charged via conductive controlled rectifiers 50-54.

When the voltages across batteries 38 and 42 are substantially equal the output voltage of error amplifier 142 is intermediate the voltages of junctions 172 and 174 and accordingly the outputs of both comparators 160 and 158 are low. Because of this, neither group of controlled rectifiers is biased conductive but battery charging can still take place through diode bridge rectifier 26.

In the description of this invention the semiconductor switches that are gated on and off have been disclosed as being groups of controlled rectifiers 50-54 and 60-64. These semiconductor switches could take forms other than controlled rectifiers, for example bipolar transistors. Thus, for example three diodes connected in series with a semiconductor switch such as a transistor could be substituted for a group of controlled rectifiers.

The groups of controlled rectifiers 50-54 and 60-64 form what may be termed a switchable rectifying circuit since they provide a rectifying function as well as a switching or switchable function since they are biased conductive and nonconductive.

The batteries 38 and 42 can be two separate batteries or can take the form of a single 24 volt battery provided in a single case or package that would have a positive terminal corresponding to junction 36, a negative terminal corresponding to the negative terminal of battery 42 and an intermediate terminal corresponding to junction 40.

The embodiments of the invention in which an exclusive property or privilege is claimed are defined as follows:

1. A dual voltage motor vehicle electrical system comprising, an alternating current generator having a polyphase output winding, a polyphase full-wave bridge rectifier comprised of groups of positive and negative diodes, said bridge rectifier having AC input terminals connected to said output winding and having positive and negative direct voltage output terminals, first and second storage batteries connected in series and across said direct voltage output terminals of said bridge rectifier, the negative terminal of one battery and the positive terminal of the other battery being connected to a common junction, a first switchable rectifying circuit connected between said junction and said AC input terminals, said first switchable rectifying circuit when biased conductive and one of said groups of diodes supplying charging current to one of said batteries, a second switchable rectifying circuit connected between said junction and said AC input terminals, said second switchable rectifying circuit when biased conductive and the other group of said diodes supplying charging current to the other battery, means for causing said switchable rectifying circuits to be biased alternately conductive, means for sensing the relative magnitudes of the voltages across said batteries, means responsive to the difference in the voltages across the batteries for controlling the time periods that said switchable rectifying circuits are biased conductive, said last-named means operative to cause the switchable rectifying circuit that supplies current to the battery that has the lower voltage to be biased conductive for a time period that is longer than the time period of conduction of the other switchable rectifying circuit means for summing the phase voltages developed by said polyphase output winding to provide a control signal that is a function of the summed phase voltages, and means responsive to said control signal for preventing simultaneous conduction of said switchable rectifying circuits.

2. The electrical system according to claim 1 where the first and second switchable rectifying circuits are comprised of first and second groups of controlled rectifiers.

3. The electrical system according to claim 1 where the means for providing the control signal comprises a summing amplifier that has one input terminal connected to the phase windings of said output winding and another input terminal connected to said common junction.

4. A dual voltage motor vehicle electrical system comprising, an alternating current generator having a polyphase output winding, a polyphase full-wave bridge rectifier comprised of groups of positive and negative diodes, said bridge rectifier having AC input terminals connected to said output winding and having positive and negative direct voltage output terminals, first and second storage batteries connected in series and across said direct voltage output terminals of said bridge rectifier, the negative terminal of one battery and the positive terminal of the other battery being connected to a common junction, a first group of controlled rectifiers connected between said junction and said AC input terminals, said first group of controlled rectifiers when biased conductive and one of said groups of diodes supplying charging current to one of said batteries, a second group of controlled rectifiers connected between said junction and said AC input terminals, said second group of controlled rectifiers when biased conductive and the other group of said diodes supplying charging current to the other battery, means for causing said groups of controlled rectifiers to be biased alternately conductive, a voltage divider having a voltage divider junction connected across said batteries, error voltage developing means connected to said common junction and to said voltage divider junction for developing an error voltage the magnitude of which is a function of the difference in voltage of the voltages at said common junction and said voltage divider junction, means responsive said error voltage for controlling the time periods that said groups of controlled rectifiers are biased conductive, said last-named means operative to cause the group of controlled rectifiers that supplies current to the battery that has the lower voltage to be biased conductive for a time period that is longer than the time period of conduction of the other groups of controlled rectifiers, means for summing the phase voltages developed by said polyphase output winding to provide a control signal that is a function of the summed phase voltages, and means responsive to said control signal for preventing simultaneous conduction of said groups of controlled rectifiers.

5. The electrical system according to claim 4 where the means for providing the control signal comprises a summing amplifier that has one input terminal connected to the phase windings of said output winding and another input terminal connected to said common junction.

* * * * *